US010217995B2

(12) United States Patent
Inagaki et al.

(10) Patent No.: US 10,217,995 B2
(45) Date of Patent: Feb. 26, 2019

(54) ACTIVE MATERIAL FOR BATTERY, NONAQUEOUS ELECTROLYTE BATTERY, AND BATTERY PACK

(71) Applicant: KABUSHIKI KAISHA TOSHIBA, Minato-ku (JP)

(72) Inventors: Hiroki Inagaki, Yokohama (JP); Wen Zhang, Sagamihara (JP); Takuya Iwasaki, Uenohara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 404 days.

(21) Appl. No.: 14/488,480

(22) Filed: Sep. 17, 2014

(65) Prior Publication Data

US 2015/0079438 A1    Mar. 19, 2015

(30) Foreign Application Priority Data

Sep. 18, 2013    (JP) .................................. 2013-193558

(51) Int. Cl.
*H01M 4/36* (2006.01)
*H01M 4/485* (2010.01)
(Continued)

(52) U.S. Cl.
CPC .......... *H01M 4/366* (2013.01); *C01G 23/047* (2013.01); *H01M 4/485* (2013.01); (Continued)

(58) Field of Classification Search
CPC ........ H01M 4/366; H01M 4/485; H01M 4/58; H01M 4/5825; H01M 4/623; H01M 2/0287; H01M 10/425
See application file for complete search history.

(56) References Cited

U.S. PATENT DOCUMENTS

2002/0031703 A1    3/2002  Kameyama et al.
2006/0134520 A1*   6/2006  Ishii .................. H01M 2/22
                                                   429/223
(Continued)

FOREIGN PATENT DOCUMENTS

EP    1 057 783 A2    12/2000
JP    2001-192208 A    7/2001
(Continued)

OTHER PUBLICATIONS

Rene Marchand, et al., "TiO$_2$(B) A new form of Titanium Dioxide and the Potassium Octatitanate K$_2$ Ti$_8$ O$_{17}$," Material Research Bulletin, vol. 15, 1980, pp. 1129-1133.
(Continued)

*Primary Examiner* — Jimmy Vo
(74) *Attorney, Agent, or Firm* — Oblon, McClelland, Maier & Neustadt, L.L.P.

(57) ABSTRACT

An active material containing a monoclinic β-type titanium oxide or a monoclinic β-type titanium complex oxide. A carbonate ion is disposed on at least a part of a surface of the active material. The active material has a peak belonging to a carbonate ion in at least a. region of 1430±30 cm$^{-1}$, 1500±30 cm$^{-1}$ and 2350±30 cm$^{-1}$ in an infrared diffuse reflection spectrum obtained using a Fourier transform infrared spectrophotometer.

19 Claims, 10 Drawing Sheets

(51) Int. Cl.
  *C01G 23/047*  (2006.01)
  *H01M 10/42*   (2006.01)
  *H01M 4/58*    (2010.01)
  *H01M 4/62*    (2006.01)
  *H01M 2/02*    (2006.01)

(52) U.S. Cl.
  CPC ...... *C01P 2002/72* (2013.01); *C01P 2002/82* (2013.01); *C01P 2006/40* (2013.01); *H01M 2/0287* (2013.01); *H01M 4/58* (2013.01); *H01M 4/5825* (2013.01); *H01M 4/623* (2013.01); *H01M 10/425* (2013.01)

(56) References Cited

U.S. PATENT DOCUMENTS

| | | | |
|---|---|---|---|
| 2006/0257746 A1 | 11/2006 | Inagaki et al. | |
| 2006/0262552 A1 | 11/2006 | Komatsu et al. | |
| 2007/0009798 A1 | 1/2007 | Inagaki et al. | |
| 2007/0292760 A1 | 12/2007 | Patoux et al. | |
| 2009/0011333 A1 | 1/2009 | Wakita et al. | |
| 2010/0248038 A1* | 9/2010 | Takami | H01M 4/364 429/332 |
| 2011/0052994 A1* | 3/2011 | Harada | C01G 23/001 429/231.5 |
| 2012/0045693 A1 | 2/2012 | Eom | |
| 2013/0189584 A1 | 7/2013 | Inagaki et al. | |

FOREIGN PATENT DOCUMENTS

| | | |
|---|---|---|
| JP | 2002-289194 A | 10/2002 |
| JP | 2003-092146 A | 3/2003 |
| JP | 3769344 B2 | 4/2006 |
| JP | 2006-318797 A | 11/2006 |
| JP | 2007-18883 A | 1/2007 |
| JP | 2008-034368 A | 2/2008 |
| JP | 4062856 B2 | 3/2008 |
| JP | 2008-117625 A | 5/2008 |
| JP | 2009-016245 A | 1/2009 |
| JP | 2009-021102 A | 1/2009 |
| JP | 2009-32704 A | 2/2009 |
| JP | 2009-176752 A | 8/2009 |
| JP | 2010-080188 A | 4/2010 |
| JP | 2010-177030 A | 8/2010 |
| JP | 2011-48947 A | 3/2011 |
| JP | 2012-43765 A | 3/2012 |
| JP | 2012-59467 A | 3/2012 |
| JP | 2013-149486 A | 8/2013 |
| WO | WO 2009/028553 A1 | 3/2009 |

OTHER PUBLICATIONS

Office Action dated Feb. 7, 2017 in Japanese Patent Application No. 2013-193558.

* cited by examiner

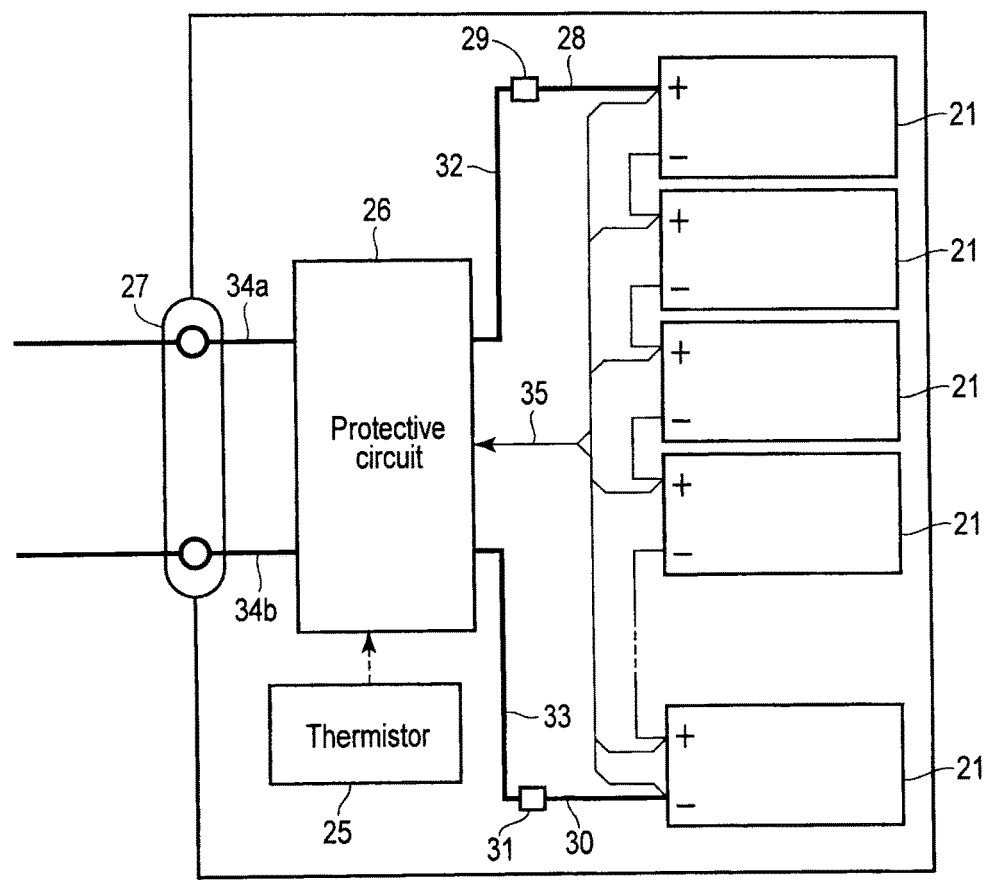
F I G. 5

ACTIVE MATERIAL FOR BATTERY, NONAQUEOUS ELECTROLYTE BATTERY, AND BATTERY PACK

CROSS-REFERENCE TO RELATED APPLICATION

This application is based upon and claims the benefit of priority from the Japanese Patent Application No. 2013-193558, filed Sep. 18, 2013 which is incorporated herein by reference.

FIELD

Embodiments described herein relate to an active material for a battery, a nonaqueous electrolyte battery, and a battery pack.

BACKGROUND

In recent years, attention has been paid to a titanium oxide having a monoclinic β-type structure as an active material for a nonaqueous electrolyte battery.

Regarding a lithium titanate having a spinel structure ($Li_4Ti_5O_{12}$), which has been hitherto put into practical use, the number of lithium ions that can be intercalated and eliminated per unit chemical formula thereof is three. For this reason, the number of lithium ions that can be intercalated and eliminated per titanium ion is theoretically 3.5, or 0.6, at most.

In the meantime, regarding a titanium oxide having a monoclinic β-type structure, the number of lithium ions that can be intercalated and eliminated per titanium ion is 1.0 at most, and thus the titanium oxide has a high theoretical capacity of about 335 mAh/g. It has been expected, accordingly, to develop a battery with an excellent performance using a titanium oxide having a monoclinic β-type structure.

BRIEF DESCRIPTION OF THE SEVERAL VIEWS OF THE DRAWING

FIG. 5 is a block diagram showing an electric circuit of the battery pack in FIG. 4;

DETAILED DESCRIPTION

In general, according to one embodiment, an active material for a battery includes a monoclinic β-type titanium oxide or a monoclinic β-type titanium complex oxide. In the active material for a battery, carbonate ions are disposed on at least a part of the surface thereof.

Hereinafter, the embodiments will be described with reference to the attached drawings.

(First Embodiment)

An active material for a battery of the first embodiment includes a monoclinic β-type titanium oxide or a monoclinic β-type titanium complex oxide. The active material for a battery of the first embodiment has further carbonate ions disposed on at least a part of the surface thereof.

Figure 1:
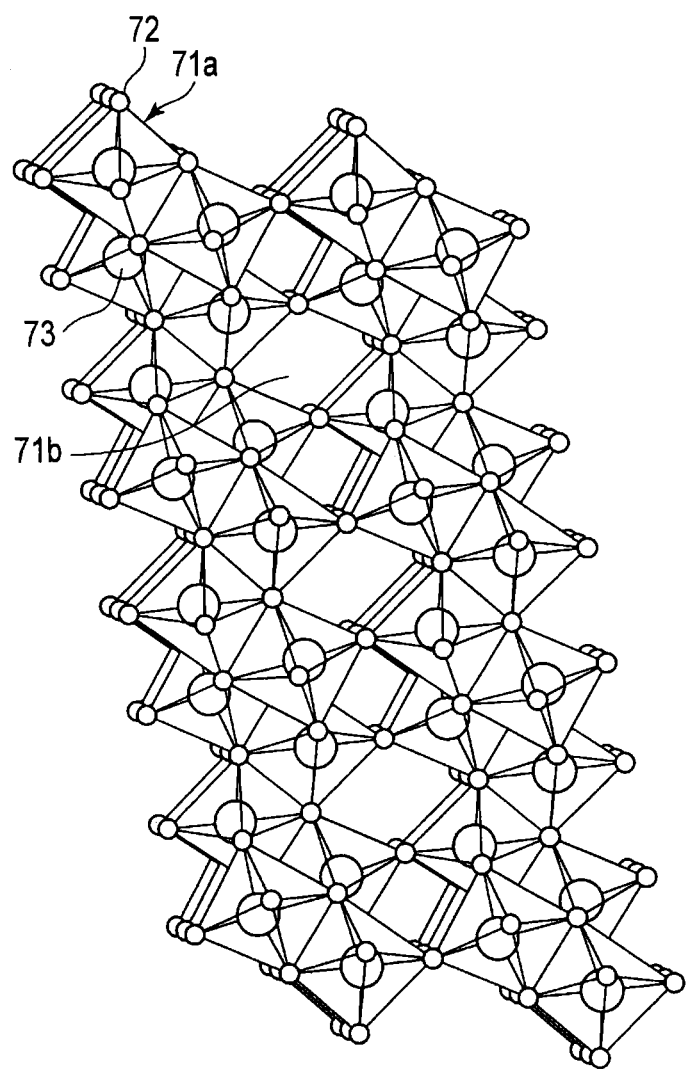
FIG. 1 is a schematic view showing the crystal structure of a monoclinic β-type titanium oxide ($TiO_2(B)$) in an active material for a battery of a first embodiment.

In the present application, the monoclinic β-type titanium oxide may be sometimes referred to as "$TiO_2(B)$." $TiO_2(B)$ belongs primarily to the space group C2/m, and has a crystal structure of a tunnel structure as shown in FIG. 1. The detailed crystal structure of $TiO_2(B)$ is described in R. Marchand, L. Brohan, M. Tournoux, Material Research Bulletin 15, 1129 (1980) (non-Patent Document 1). The term "monoclinic β-type titanium complex oxide" refers to a titanium complex oxide having a crystal structure of monoclinic titanium dioxide.

As shown in FIG. 1, in the crystal structure of $TiO_2(B)$, a titanium ion 73 and oxide ions 72 constitute skeleton structural moieties 71a. The skeleton structural moieties 71a are alternately arranged. Between the skeleton structural moieties 71a, voids 71b are formed. The voids 71b can each become a host site in which a different atom species is intercalated (i.e., inserted). It is said about $TiO_2(B)$ that host sites which are each capable of adsorbing and releasing a different atom species are also present in a surface of the crystal thereof. Lithium ions are intercalated into these host sites and eliminated therefrom, whereby $TiO_2(B)$ can reversibly adsorb and release the lithium ions.

When lithium ions are intercalated into the voids 71b, $Ti^{4+}$ ions which constitute the skeleton are reduced to $Ti^{3+}$ ions. In this way, the crystal is kept electrically neutral. $TiO_2(B)$ has a single $Ti^{4+}$ ion per unit chemical formula thereof. Thus, theoretically, at most, one lithium ion can be intercalated between any two of the layers. For this reason, $TiO_2(B)$ can be represented by the following formula: $Li_xTiO_2$ wherein $0 \leq x \leq 1$. In this case, a theoretical capacity of 335 mAh/g is obtained.

It has been known that in the process of synthesizing a monoclinic β-type titanium oxide, hydroxyl groups tend to remain, thus resulting in a high concentration of acid sites in solid acid. The hydroxyl groups present in the titanium oxide cause decomposition of an electrolytic solution, which generates decomposition products such as lithium fluoride and lithium oxide, which turn into resistance components on an active material surface. Moreover, the hydroxyl groups react immediately with a lithium salt in the nonaqueous electrolytic solution, generating a free acid. The decomposition reaction of the electrolytic solution easily proceeds at the acid sites in solid acid, which reduces the charge/discharge efficiency. These factors cause a fall in performances of the battery, such as the lifetime performance and the high-current performance.

In the process of synthesizing a monoclinic β-type titanium complex oxide, an intermediate product is sintered at a low temperature. As a result, hydroxyl groups seem to remain in the monoclinic β-type titanium complex oxide. In an ordinary synthesis process, a proton exchange body as an intermediate product is sintered at a temperature of about 400° C., thereby undergoing a dehydration reaction. In order to remove the hydroxyl groups completely, it is necessary for the proton exchange body to be heated at a high temperature of about 800° C. In this case, however, there is caused a problem that the crystal structure is changed.

The active material for a battery of the first embodiment, accordingly, includes a monoclinic β-type titanium oxide or a monoclinic β-type titanium complex oxide having carbonate ions disposed on at least a part of the surface thereof. The carbonate ions disposed on a part of the surface can reduce the hydroxyl groups on the surface and can drastically reduce the concentration of acid sites in solid acid and significantly enhance an initial charge/discharge efficiency. In particular, when the carbonate ion is in the state of lithium carbonate, that is, lithium carbonate is disposed on at least a part of the surface, the initial charge/discharge efficiency is dramatically enhanced, and a more excellent charge/discharge property can be realized.

It is believed that, in the first embodiment, the effects can be obtained by disposing the carbonate ions on a part of the surface, and the larger the area on which the carbonate ions disposed, the higher the effect. In particular, it appears that a higher effect can be obtained when the entire surface is covered with the ions. When the active material for a battery of the first embodiment is applied to a battery, the reactivity between the active material for a battery and the electrolytic solution can be inhibited and the initial charge/discharge efficiency can be enhanced, which can contribute to a high-current property and an excellent charge/discharge cycle performance.

The monoclinic β-type titanium oxide or the monoclinic β-type titanium complex oxide, which is included in the active material for a battery of the first embodiment, may be in the state of a particle. In the active material for a battery of the first embodiment, it is preferable that the particles (primary particles) of the monoclinic β-type titanium oxide or the monoclinic β-type titanium complex oxide are formed into aggregates (secondary particles).

Such particles (primary particles) may be spherical or near-spherical, or the particles (primary particles) may be fibrous.

When the particles (primary particles) are spherical or near-spherical, an average particle diameter is preferably 10 nm or more and 1 μm or less. When the particles have an average particle diameter of 10 nm or more, the particles are easily handled in an industrial production thereof; whereas when it is 1 μm or less, the lithium ions can be smoothly diffused in the solid of the monoclinic β-type titanium oxide or the monoclinic β-type titanium complex oxide.

When the particles (primary particles) are fibrous, the average diameter is, for example, 10 nm or more and 1 μm or less. The average length thereof is, for example, 1 μm or more and 10 μm or less. In particular, it is preferable that the average diameter is about 200 nm and the average length is about 1 μm.

The secondary particles preferably have an average particle diameter of 1 μm or more and 100 μm or less. When the average particle diameter is 1 μm or more, the particles are easily handled in an industrial production thereof; whereas when it is 100 μm or less, a mass weight and a thickness can be easily uniformized in a coated film for producing a electrode, and a surface smoothness is improved.

The secondary particles preferably have a specific surface area of 5 m$^2$/g or more and 50 m$^2$/g or less. When the specific surface area is 5 m$^2$/g or more, adsorbing and eliminating sites of the lithium ions can be sufficiently secured; whereas when the specific surface area is 50 m$^2$/g or less, the particles are easily handled in an industrial production thereof.

The active material for a battery of the first embodiment has a carbon content of, for example, 0.01% by mass or more and 3% by mass or less, based on the total amount of active material for a battery, preferably 0.02% by mass or more, and 1% by mass or less. When carbonate ions are disposed in a carbon concentration of 0.01% by mass or more, sufficient effects can be obtained, side reactions with the electrolytic solution can be reduced, and excessive formation of high resistance coatings can be inhibited. Even if there are many carbonate ions on the surface, the effects in the first embodiment are not lost, but the many carbonate ions lead to a reduced active material capacity as well as the ions themselves becoming a resistance component, and thus it is preferable to adjust a carbon concentration to 3% by mass or less.

An amount of carbon included in the monoclinic β-type titanium oxide or the monoclinic β-type titanium complex oxide can be quantified by a high frequency heating-infrared absorbing method. For example, a titanium complex oxide, which has been taken out from a battery, is dried at 150° C. for 12 hours, the resultant oxide is weighted and transferred to a container, and then the amount can be measured by a measuring device (e.g., CS-444 LS manufactured by LECO Corporation).

The existential state of the carbon can be evaluated by line analysis, carbon mapping, or the like, using Electron Probe Microanalysis (EPMA) for the cross-section of an active material.

In the first embodiment, the existence of a carbonate ion ($CO_3^-$) can be confirmed by a Fourier transform infrared spectrophotometer (FT-IR). A peak derived from the carbonate ion ($CO_3^-$) appears on at least an area of 1430±30 cm$^{-1}$, 1500±30 cm$^{-1}$ and 2350±30 cm$^{-1}$ in an infrared reflection spectrum.

The monoclinic β-type titanium oxide or the monoclinic β-type titanium complex oxide can be taken out from a battery, for example, in a manner described below. First, a battery in a discharge state is disassembled to take out an electrode (e.g., a negative electrode) from the battery, and the electrode is washed with methyl ethyl carbonate. The washed negative electrode layer is deactivated in water, and a titanium complex oxide is taken out from the negative electrode layer using a centrifugal separator, or the like.

When the active material in the first embodiment is used as a negative electrode active material, the material may be used alone, or may be used together with another active material. As the other active material, for example, lithium titanium complex oxides having a spinel structure ($Li_4Ti_5O_{12}$, and the like), titanium complex oxides having an anatase or rutile structure (a-$TiO_2$, r-$TiO_2$, and the like), niobium complex oxides ($Nb_2O_5$, $Nb_2TiO_7$, and the like), iron complex sulfides (FeS, $FeS_2$, and the like), and the like may be used.

When the active material in the first embodiment is used as a positive electrode active material, the material may be used alone, or may be used together with another active material. As the other active material, for example, lithium titanium complex oxides having a spinel structure ($Li_4Ti_5O_{12}$, and the like), titanium complex oxides having an anatase or rutile structure (a-$TiO_2$, r-$TiO_2$, and the like), niobium complex oxides ($Nb_2O_5$, $Nb_2TiO_7$, and the like), iron complex sulfides (FeS, $FeS_2$, and the like), and the like may be used.

In any case where the active material for a battery of the first embodiment is used as the negative electrode and the positive electrode, an excellent charge/discharge cycle performance can be obtained. The charge/discharge cycle performance is an effect obtained by disposing the carbonate ions on the surface, and even if the active material is used as the negative electrode or as the positive electrode, there is no difference in the obtained effect, and the same effect can be obtained in both cases.

When the active material for a battery of the first embodiment is used as a positive electrode, metal lithium, lithium alloy, or a carbon material such as graphite or coke may be used as an active material of a negative electrode, which is a counter electrode.

When another active material is included in an electrode, measurement can be performed as follows: a negative electrode active material, taken out from an electrode, is subjected to Transmission Electron Microscope-Energy Dispersive X-ray spectrometry (TEM-EDX), and a crystal structure of each particle is specified by a selected area diffraction method. Particles having a diffraction pattern belonging to $TiO_2$(B) are selected, and a carbon content is measured. At that time, if carbon mapping is carried out by EDX, an area in which carbon is present can be found.

As for the Fourier transform infrared spectrophotometer (FT-IR), a titanium complex oxide, which is taken out in the same manner as above, is fixed on a measuring tool and measurement is performed. For example, the measurement can be performed under the conditions described below using an apparatus described below. Fourier transform-type FTIR apparatus: FTS-60A (manufactured by BioRad Digilab Inc.)

Light source: Special ceramic material
Detector: DTGS
Wavenumber resolving power: 4 $cm^{-1}$
The number of multiplication times: 256
Attached device: Diffuse reflection measuring device (manufactured by PIKE Technologies Inc.), Window plate: $CaF_2$
Reference: Gold (Production Method)

Next, a method of producing an active material for a battery of the first embodiment will be explained.

The production method includes a step of obtaining a proton exchange precursor; a step of reacting the proton exchange precursor with an acid to exchange the alkali cation for a proton, thereby obtaining a proton exchange body; a step of heating the proton exchange body to obtain a monoclinic β-type titanium oxide or a monoclinic β-type titanium complex oxide; and a step of disposing carbonate ions on a surface.

The proton exchange precursor may be synthesized by a conventional method. For example, the precursor may be synthesized by subjecting a starting material to a heat treatment in accordance with an ordinary solid phase reaction process. The proton exchange precursor may have any crystal shape. In the case of using potassium titanate ($K_2Ti_4O_9$) as the proton exchange precursor, for example, a flux process may be used to synthesize the precursor.

First, the starting materials are mixed at a predetermined ratio, and the mixture is subjected to a heat treatment to obtain an alkali titanate compound. The alkali titanate compound is used as a proton exchange precursor. The heat treatment is preferably conducted at a temperature in the range of 800 to 1200° C. for 1 to 100 hours.

As the starting material, titanium-containing compounds and alkali cation-containing compounds may be used, and examples thereof may include $TiO_2$ having an anatase structure, $K_2CO_3$, $Na_2CO_3$, $Cs_2CO_3$, and the like.

A preferable alkali titanate compound includes, but is not limited to, a sodium titanate, a potassium titanate, and a cesium titanate such as $Na_2Ti_3O_7$, $K_2Ti_4O_9$, and $Cs_2Ti_5O_{12}$, and a more preferable alkali titanate compound is $K_2Ti_4O_9$. A mixing ratio of the starting materials is decided depending on a desired alkali titanate compound.

Next, proton exchange is conducted. The resultant proton exchange precursor is sufficiently washed with distilled water to remove impurities. Thereafter, the precursor is treated with an acid to exchange alkali cations for protons. The acid treatment may be conducted, for example, by adding the proton exchange precursor into hydrochloric acid having a concentration of 1 M, and then stirring the solution. It is desired to conduct the acid treatment until a sufficient proton exchange is finished. After the proton exchange has finished, the resultant is again washed with distilled water. Regarding sodium titanate, potassium titanate and cesium titanate, their alkali cations can be exchanged for protons without decomposing their crystal structure.

Before the proton exchange is conducted, it is preferred to previously pulverize the proton exchange precursor in a ball mill. When the proton exchange precursor is pulverized, the proton exchange can be conducted smoothly. The pulverization may be carried out by adding a sample to a zirconia container together with zirconia balls and rotating the mixture under conditions of a rotation speed of 600 to 1000 rpm for about 1 to 3 hours. The proton exchange precursor can be sufficiently pulverized by carrying out the pulverization for one hour or more. If the pulverizing time is 3 hours or less, such a phenomenon that compounds different from a target product are generated by a mechanochemical reaction can be prevented.

After the proton exchange has finished, the product is washed with water and dried to obtain a proton exchange body, which is an intermediate product. The proton exchange body is subjected to a heat treatment to obtain a monoclinic β-type titanium complex oxide.

The heat treatment of the proton exchange body is preferably conducted at 250° C. to 500° C. When the heating temperature is set at 250° C. or higher, the crystallinity is improved, whereby the electrode capacity, the charge/discharge efficiency and the repetitive property can be improved. On the other hand, when the heating temperature is set at 500° C. or lower, the generation of an impurity phase such as an anatase phase can be restrained so that a reduction in the capacity can be prevented. The heating temperature is more preferably from 300° C. to 400° C.

The average particle diameter of the primary particle and that of the secondary particle can be adjusted by changing the temperature and duration of the heat treatment.

Next, a method of subjecting a monoclinic β-type titanium complex oxide to a treatment to obtain a monoclinic β-type titanium complex oxide having carbonate ions disposed on its surface will be described.

The treatment can be carried out by directly bringing the monoclinic β-type titanium complex oxide as produced above into contact with a carbonate ion-containing solution or a hydroxide ion-containing solution. For example, the treatment is carried out as follows:

The monoclinic β-type titanium complex oxide, synthesized in the method described above, is added to a given amount of an aqueous solution including lithium carbonate (carbonate ions) or lithium hydroxide (hydroxide ions), and the mixture is stirred. The obtained solution is dried at, for example, 80° C. to evaporate the water, whereby a monoclinic β-type titanium complex oxide on which lithium carbonate or lithium hydroxide is disposed can be obtained. The lithium hydroxide comparatively quickly turns to lithium carbonate in such atmosphere.

It is preferable to subject again the monoclinic β-type titanium complex oxide to which the carbonate ions adhere to a heat treatment. The heat treatment may be carried out in an atmosphere under treatment conditions such as a temperature of 100° C. to 600° C. (preferably 300° C. to 450° C.) and a time of 10 minutes to 100 hours (preferably 1 hour to 24 hours). When the heat treatment is carried out again under the conditions described above, carbonate ions which are finer and have a high adhesion property can adhere to the complex oxide.

The carbonate ions can be adhered to at least a part of the surface of the monoclinic β-type titanium complex oxide by the treatment described above.

The carbonate ions may be generated by using a hydroxide salt and directly exposed to carbonate gas before and after the heat re-treatment.

The first embodiment described above can provide an active material for a battery capable of contributing to an excellent charge/discharge cycle performance.

(Second Embodiment)

Next, a nonaqueous electrolyte battery of a second embodiment will be explained.

The nonaqueous electrolyte battery of the second embodiment includes a positive electrode, a negative electrode including the active material for a battery of the first embodiment, and a nonaqueous electrolyte. The nonaqueous electrolyte battery of the second embodiment may include a case. In such a case, the nonaqueous electrolyte battery includes a case, a positive electrode accommodated in a case, a negative electrode including an active material accommodated in the case and spatially apart from the positive electrode through, for example, a separator, and a nonaqueous electrolyte filled in the case.

Figure 2:
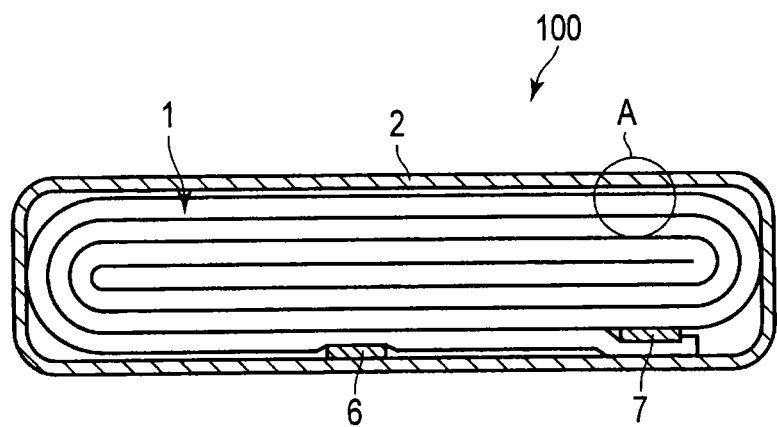
FIG. 2 is a sectional view showing a flat type nonaqueous electrolyte battery of a second embodiment.
Figure 3:
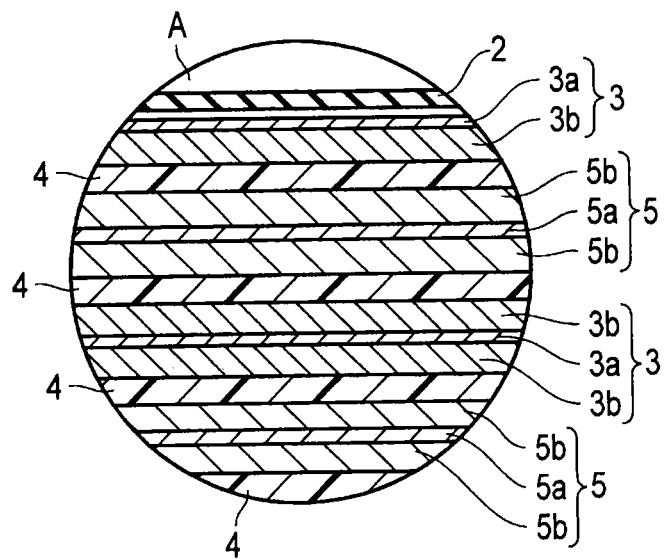
FIG. 3 is an enlarged sectional view of the part A in FIG. 2.

The embodiment will be explained in more detail referring to FIGS. 2 and 3 showing one example of a nonaqueous electrolyte battery 100 of the embodiment. FIG. 2 is a sectional view of a flat type nonaqueous electrolyte battery 100 including a case 2 formed of a laminate film. FIG. 3 is an enlarged sectional view of a part A in FIG. 2. The figures are schematic views to aid in the explanation. The shapes, sizes, ratios, and other aspects of the device may be different from those used in actual practice; however, such aspects may be appropriately changed with reference the following description and any known technique.

A flat coil electrode group 1 is accommodated in a bag-form case 2 formed of a laminate film in which an aluminum foil is interposed between two resin layers. The flat coil electrode group 1 is formed by spirally coiling a laminate, which is obtained by laminating a negative electrode 3, a separator 4, a positive electrode 5, and a separator 4 in this order from the outside, and press-molding the coiled laminate. The outermost negative electrode 3 has a structure in which as shown in FIG. 3, a negative electrode layer 3b is formed on one inside surface of a negative electrode current collector 3a. Other negative electrodes 3 each have a structure in which a negative electrode layer 3b is formed on each surface of the negative electrode current collector 3a. An active material in the negative electrode layer 3b includes the active material for a battery of the first embodiment. The positive electrode 5 has a structure provided with a positive electrode layer 5b on each side of a positive electrode current collector 5a.

In the vicinity of the outer peripheral end of the coil electrode group 1, a negative electrode terminal 6 is electrically connected to the negative electrode current collector 3a of the outermost negative electrode 3 and a positive electrode terminal 7 is electrically connected to the positive electrode current collector 5a of the inside positive electrode 5. The negative electrode terminal 6 and the positive electrode terminal 7 are externally extended from an opening part of the bag-form case 2. A liquid nonaqueous electrolyte is, for example, injected from the opening part of the bag-form case 2. The opening part of the bag-form case 2 is closed by heat sealing, while the negative electrode terminal 6 and positive electrode terminal 7 are put in the sealing part, whereby the coil electrode group 1 and the liquid nonaqueous electrolyte are completely sealed in the case.

For the negative electrode terminal 6, for example, a material having electroconductivity and electrical stability in a potential range of 1 V or more and 3 V or less relative to a metallic lithium may be used. Specific examples thereof include aluminum and an aluminum alloy containing element(s) such as Mg, Ti, Zn, Mn, Fe, Cu, and Si. The negative electrode terminal 6 is preferably formed of the same material as the negative electrode current collector 3a to reduce the contact resistance with the negative electrode current collector 3a.

The positive electrode terminal 7 may be formed of, for example, a material having electroconductivity, and electrical stability in a potential range from 3 to 4.25 V relative to metallic lithium. A specific example thereof includes aluminum, and an aluminum alloy containing element(s) such as Mg, Ti, Zn, Mn, Fe, Cu, and Si. The positive electrode terminal 7 is preferably formed of the same material as the positive electrode current collector 5a to reduce the contact resistance with the positive electrode current collector 5a.

Hereinafter, a detailed description is made about the case 2, the negative electrode 3, the positive electrode 5, the separators 4 and the nonaqueous electrolyte, which constitute members of the nonaqueous electrolyte battery 100.

1) Case

The case 2 is formed of a laminate film having a thickness of 0.5 mm or less, or a metallic vessel having a thickness of 1.0 mm or less. The thickness of the metallic vessel is preferably 0.5 mm or less.

The shape of the case may be selected from a flat type (thin type), angular type, cylinder type, coin type and button type. Examples of the case include, depending on the dimensions of the battery, a case for small-sized batteries to be mounted on portable electronic devices and a case for large-sized batteries to be mounted on, for example, two- to four-wheel vehicles.

A multilayer film obtained by interposing a metal layer between resin layers is used as the laminate film. The metal layer is preferably an aluminum foil or aluminum alloy foil in view of light-weight characteristics. Polymer materials such as a polypropylene (PP), polyethylene (PE), nylon and polyethylene terephthalate (PET) may be used for the resin layer. The laminate film can be molded into the shape of the case by heat sealing.

The metal case may be formed from aluminum, an aluminum alloy or the like. The aluminum alloy is preferably an alloy including elements such as Mg, Zn and Si.

When the alloy includes a transition metal such as Fe, Cu, Ni or Cr, the content of thereof is preferably 100 ppm by mass or less.

2) Negative Electrode

The negative electrode 3 includes the current collector 3a, and the negative electrode layer 3b, which is formed on one or both surfaces of the current collector 3a and includes an active material, a conductive agent, and a binder.

The active material for a battery of the first embodiment described above is used as the active material.

The nonaqueous electrolyte battery 100 in which the negative electrode 3 having the negative electrode layer 3b including such an active material is incorporated has the high-current property and the excellent charge/discharge cycle performance.

The conductive agent improves the current collecting performance of the active material and reduces the contact resistance with the current collector. Examples of the conductive agent include carbonaceous materials such as acetylene black, carbon black and graphite.

The binder enables the active material and the conductive agent to bind to each other. Examples of the binder include polytetrafluoroethylene (PTFE), polyvinylidene fluoride (PVdF), fluorine-containing rubber, and styrene butadiene rubber.

The polyvinylidene fluoride (PVdF) is preferable as the negative electrode binder in the embodiment. The monoclinic β-type titanium complex oxide is an acidic substance having a pH of 3 to 4, because the acid treatment is carried out on the proton exchange during the synthesizing process. When the polyvinylidene fluoride (PVdF) is used as the binder, accordingly, a peel strength is not enhanced. In the embodiment, when lithium carbonate is disposed on the surface of the monoclinic β-type titanium complex oxide, the pH shifts to a basic range, whereby a defluoridation reaction of polyvinylidene fluoride (PVdF), which is the binder, occurs appropriately, thus resulting in a greatly improved peel strength.

In the negative electrode layer 3b, the active material, the conductive agent and the binder are preferably formulated in ratios of 70% by mass or more and 96% by mass or less, 2% by mass or more and 28% by mass or less, and 2% by mass or more and 28% by mass or less, respectively. When the amount of the conductive agent is 2% by mass or more, the current collecting performance of the negative electrode layer 3b is improved so that the high-current characteristic of the nonaqueous electrolyte battery 100 can be improved. When the amount of the binder is 2% by mass or more, the binding performance between the negative electrode layer 3b and the current collector 3a is enhanced so that the cycle performance can be improved. On the other hand, when the amount of the conductive agent and the binder are each 28% by mass or less, the capacity of the battery can be favorably made high.

The current collector 3a is preferably formed from an aluminum foil, which is electrochemically stable in a potential range nobler than 1 V, or an aluminum alloy foil containing element(s) such as Mg, Ti, Zn, Mn, Fe, Cu, and Si.

The negative electrode 3 can be manufactured by suspending, for example, the active material, the conductive agent and the binder in a solvent usually used to prepare a slurry, by applying this slurry to the current collector 3a, by drying the slurry, and then by pressing it. The negative electrode 3 may also be manufactured by forming the active material, the conductive agent and the binder into pellets, by forming a negative electrode layer 3b from the pellets, and by placing it on the current collector 3a.

3) Positive Electrode

The positive electrode 5 includes the current collector 5a, and the positive electrode layer 5b, which is formed on one or both sides of the current collector 5a and includes the active material, the conductive agent and the binder. As the active material, for example, oxides and polymers may be used.

Examples of the oxide include manganese dioxide ($MnO_2$), iron oxide, copper oxide and nickel oxide in which lithium is adsorbed, lithium manganese complex oxide (such as $Li_xMn_2O_4$ and $Li_xMnO_2$), lithium nickel complex oxide (such as $Li_xNiO_2$), lithium cobalt complex oxide (such as $Li_xCoO_2$), lithium nickel cobalt complex oxide (such as $LiNi_{1-y}CO_yO_2$), lithium manganese cobalt complex oxide (such as $Li_xMn_yCO_{1-y}O_2$), lithium manganese nickel complex oxide having a spinel structure (such as $Li_xMn_{2-y}Ni_yO_4$), lithium phosphorus oxide having an olivine structure (such as $Li_xFePO_4$, $Li_xFe_{1-y}Mn_yPO_4$ and $Li_xCoPO_4$), iron sulfate ($Fe_2(SO_4)_3$), and vanadium oxide (such as $V_2O_5$), wherein x and y preferably satisfy the following: $0 \leq x \leq 1$ and $0 \leq y \leq 1$.

As the polymer, a conductive polymer material such as polyaniline or polypyrrole, or a disulfide polymer material may be used. Sulfur (S) and carbon fluoride also may be used as the active material.

Preferred examples of the active material include a lithium manganese complex oxide ($Li_xMn_2O_4$), a lithium nickel complex oxide ($Li_xNiO_2$), a lithium cobalt complex oxide ($Li_xCoO_2$), a lithium nickel cobalt complex oxide ($Li_xNi_{1-y}CO_yO_2$), a lithium manganese nickel complex oxide having a spinel structure ($Li_xMn_{2-y}Ni_yO_4$), a lithium manganese cobalt complex oxide ($Li_xMn_yCO_{1-y}O_2$), and a lithium iron phosphate ($LixFePO_4$), each of which gives a high positive electrode voltage, wherein x and y preferably satisfy the following: $0 \leq x \leq 1$ and $0 \leq y \leq 1$.

The active material is more preferably a lithium cobalt complex oxide or a lithium manganese complex oxide. The active materials are high in ion conductivity, and thus, in any combination with the negative electrode active material described above, the diffusion of lithium ions in the positive electrode active material scarcely becomes a rate-determining step. The active material is, therefore, excellent in adaptability to the lithium titanium complex oxide in the negative electrode active material.

The conductive agent improves the current collecting performance of the active material, and reduces the contact resistance with the current collector. Examples of the conductive agent include carbonaceous materials such as acetylene black, carbon black and graphite.

The binder binds the active material with the conductive agent. Examples of the binder include polytetrafluoroethylene (PTFE), polyvinylidene fluoride (PVdF), and fluorine-containing rubber.

In the positive electrode layer 5b, the active material, the conductive agent and the binder are preferably formulated in ratios of 80% by mass or more and 95% by mass or less, 3% by mass or more and 18% by mass or less, and 2% by mass or more and 17% by mass or less, respectively. When the amount of the conductive agent is 3% by mass or more, the advantageous effects can be exhibited. When the amount of the conductive agent is 18% by mass or less, the decomposition of the nonaqueous electrolyte on the surface of the conductive agent can be decreased during high temperature storage. When the amount of the binder is 2% by mass or more, sufficient positive electrode strength can be obtained.

When the amount of the binder is 17% by mass or less, the formulated ratio of the binder, which is an insulating material in the positive electrode, is decreased so that the internal resistance can be decreased.

The current collector is preferably an aluminum foil, or an aluminum alloy foil including element(s) such as Mg, Ti, Zn, Mn, Fe, Cu, and Si.

The positive electrode 5 may be manufactured by suspending, for example, the active material, the conductive agent and the binder in a solvent usually used to prepare slurry, by applying this slurry to the current collector 5a, by drying the slurry, and then by pressing it. The positive electrode 5 may also be manufactured by forming the active material, the conductive agent and the binder into pellets, by forming a positive electrode layer 5b from the pellets, and by placing it on the current collector 5a.

4) Nonaqueous Electrolyte

The nonaqueous electrolyte may be a liquid nonaqueous electrolyte prepared, for example, by dissolving an electrolyte in an organic solvent, or a gel-like nonaqueous electrolyte prepared by forming a complex of a liquid electrolyte and a polymer material.

The liquid nonaqueous electrolyte is preferably prepared by dissolving the electrolyte in an organic solvent in a concentration of 0.5 M or more and 2.5 M or less.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), and bistrifluoromethylsulfonylimide lithium [$LiN(CF_3SO_2)_2$], and mixtures of the compounds. The electrolyte is preferably one which is resistant to oxidizing even at a high potential and $LiPF_6$ is most preferable.

Examples of the organic solvent include cyclic carbonates such as propylene carbonate (PC), ethylene carbonate (EC) and vinylene carbonate; linear carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); linear ethers such as dimethoxyethane (DME) and diethoxyethane (DEE); γ-butyrolactone (GBL), acetonitrile (AN) and sulfolan (SL). The organic solvents may be used either solely or in combinations of two or more.

Examples of the polymer material include polyvinylidene fluoride (PVdF), polyacrylonitrile (PAN) and polyethylene oxide (PEO).

The preferable organic solvent may include mixed solvents of at least two solvents selected from the group consisting of propylene carbonate (PC), ethylene carbonate (EC) and diethyl carbonate (DEC), and mixed solvents containing γ-butyrolactone (GBL). When the mixed solvent is used, a nonaqueous electrolyte battery excellent in high-temperature property can be obtained.

5) Separator

The separator 4 may be formed of a porous film including polyethylene, polypropylene, cellulose or polyvinylidene fluoride (PVdF), or a synthetic resin nonwoven fabric. A porous film formed of the polyethylene or polypropylene is preferable, which melts at a certain temperature, making it possible to shut off current and therefore improve safety.

The second embodiment described above can provide a nonaqueous electrolyte battery having an excellent charge/discharge cycle performance.

(Third Embodiment)

Next, a battery pack of a third embodiment will be explained.

The battery pack of the third embodiment includes one or more of the nonaqueous electrolyte batteries (that is, unit cells) according to the second embodiment. When the battery pack includes two or more unit cells, the unit cells are disposed in such a manner that they are electrically connected in series or in parallel, or electrically connected by a combination of series-parallel cell connections.

Figure 4:
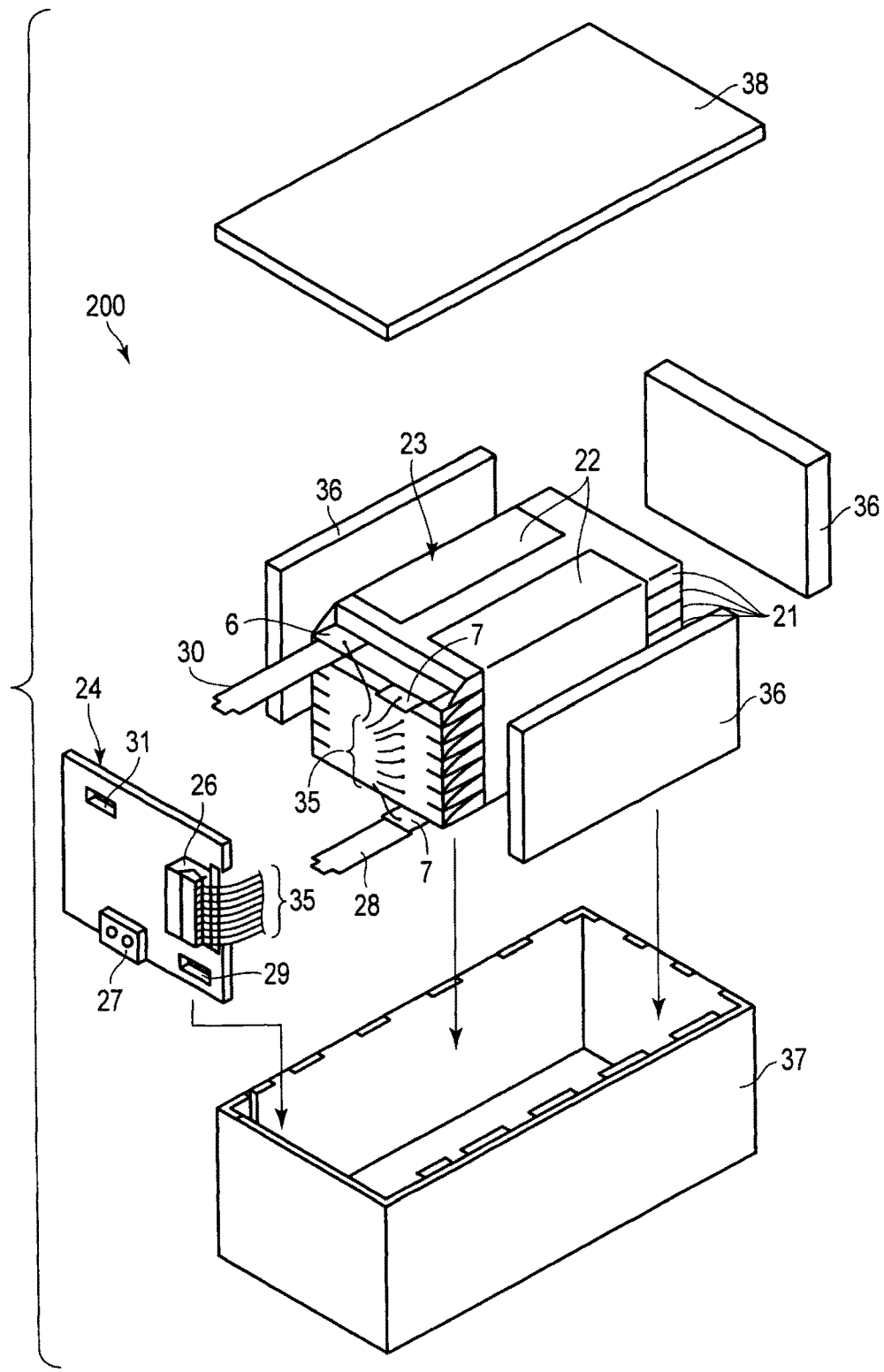
FIG. 4 is an exploded perspective view of a battery pack of a third embodiment.

Referring to FIGS. 4 and 5, a battery pack 200 will be specifically explained. In the battery pack 200 shown in FIG. 4, the nonaqueous electrolytic solution battery shown in FIG. 2 is used as each unit cell 21.

A plurality of unit cells 21 are laminated such that the externally extended negative electrode terminal 6 and positive electrode terminal 7 are arranged in the same direction and fastened with a pressure-sensitive adhesive tape 22 to thereby constitute a battery module 23. The unit cells 21 are electrically connected in series as shown in FIG. 5.

A printed wiring board 24 is disposed opposite to the side surface of the unit cell 21 from which the negative electrode terminal 6 and positive electrode terminal 7 are extended. As shown in FIG. 5, a thermistor 25, a protection circuit 26 and an energizing terminal 27 connected to external devices are mounted on the printed wiring board 24. An insulating plate (not shown) is attached to the surface of the protection circuit substrate 24 facing the battery module 23 to avoid unnecessary connection with the wiring of the battery module 23.

A positive electrode lead 28 is connected to the positive electrode terminal 7 positioned on the lowermost layer of the battery module 23 and the end thereof is inserted into and electrically connected to a positive electrode connector 29 of the printed wiring board 24. A negative electrode lead 30 is connected to the negative electrode terminal 6 positioned on the uppermost layer of the battery module 23 and the end thereof is inserted into and electrically connected to a negative electrode connector 31 of the printed wiring board 24. These connectors 29 and 31 are connected to the protection circuit 26 through wirings 32 and 33 formed on the printed wiring board 24.

The thermistor 25 is used to detect the temperature of the unit cell 21 and the detected signals are transmitted to the protection circuit 26. The protection circuit 26 can shut off a positive wiring 34a and a negative wiring 34b between the protection circuit 26 and the energizing terminal 27 to the external devices under a predetermined condition. The predetermined condition refers to, for example, a case where the temperature detected by the thermistor 25 is a predetermined one or higher. The predetermined condition also refers to, for example, a case of detecting over-charge, over-discharge and over-current of the unit cell 21. The detections of the over-charge and the like are made for individual unit cells 21 or whole unit cells 21. When individual unit cells 21 are detected, either the voltage of the battery may be detected or the potential of the positive electrode or the negative electrode may be detected. In the latter case, a lithium electrode used as a reference electrode is inserted into individual unit cells 21. In the case of FIGS. 4 and 5, a wiring 35 for detecting voltage is connected to each unit cell 21 and the detected signals are transmitted to the protection circuit 26 through the wirings 35.

A protective sheet 36 formed of rubber or a resin is disposed on each of the three side surfaces of the battery module 23 excluding the side surface from which the positive electrode terminal 7 and negative electrode terminal 6 are projected.

The battery module 23 is accommodated in a storage container 37 together with the protective sheets 36 and the printed wiring board 24. Specifically, the protective sheet 36 is disposed on each inside surface in the direction of the long side and on one of the inside surfaces in the direction of the short side of the storage container 37, and the printed wiring board 24 is disposed on the other inside surface in the direction of the short side. The battery module 23 is positioned in a space enclosed by the protective sheets 36 and the printed wiring board 24. A lid 38 is attached to the upper surface of the storage container 37.

Here, a heat-shrinkable tape may be used in place of the pressure-sensitive adhesive tape 22 to secure the battery module 23. In that case, after protective sheets are disposed on both sides of the battery module and the heat-shrinkable tapes are wound around the battery module, the heat-shrinkable tape is shrunk by heating to fasten the battery module.

The structure in which the unit cells 21 are connected in series is shown in FIGS. 4 and 5, but the unit cells may be connected in parallel to increase the capacity of the battery, or the unit cells may be connected by a combination of series-parallel cell connections. The assembled battery packs may be further connected in series or parallel.

The third embodiment described above can provide a battery pack excellent in charge/discharge cycle performance by using the nonaqueous electrolyte battery having the excellent charge/discharge cycle performance of the second embodiment.

The form of the battery pack may be appropriately changed in accordance with the usage thereof. The battery pack is preferably used for an article exhibiting an excellent cycle performance when a large current is taken out therefrom. Specifically, the pack is used for, for example, a power source of a digital camera, a hybrid electric two- to four-wheeled vehicle, an electric two- to four-wheeled vehicle, an assisting bicycle, or some other vehicle. In particular, the battery pack using a nonaqueous electrolyte battery excellent in high-temperature property is preferably used for a vehicle.

(Fourth Embodiment)

The vehicle according to the fourth embodiment includes the battery pack according to the third embodiment. Examples of the vehicle include hybrid electric two- to four-wheeled vehicles, electric two- to four-wheeled vehicles, assisting bicycles, and the like.

Examples of the fourth embodiment may include hybrid type vehicles using a running power source which is produced by a combination of an internal combustion engine and an electromotor drivable by a battery. The driving power of any vehicle requires the number of revolutions and torque to be controllable over a wide range. In general, torque and revolution number which exhibit ideal energy efficiency are restricted in internal combustion engines, and thus, under other driving conditions, the energy efficiency is lowered. The hybrid type vehicle has a characteristic that its internal combustion engine is driven under optimum conditions to generate electric power and further its wheels are driven by a highly efficient electromotor, or the dynamic power of its internal combustion engine and that of its electromotor are combined with each other to drive the wheels, whereby the energy efficiency of the whole vehicle can be improved. Moreover, when the speed of the vehicle decreases, the kinetic energy of the vehicle is converted to electric power, whereby the mileage thereof can be more greatly increased than that of ordinary vehicles drivable by their internal combustion engine alone.

The hybrid vehicles can be roughly classified into three types in accordance with the combination of their internal combustion engine with their electromotor.

The first is a hybrid vehicle which is generally called a series hybrid car. In such a vehicle, the dynamic power of an internal combustion engine is once converted to electric power through a power source, and the obtained electric power is stored in a battery pack through an inverter. As this battery pack, the battery pack according to the third embodiment may be used. The electric power of the battery pack is supplied through the inverter to an electromotor. The electromotor drives wheels. In this system, an electromotor is hybridized with an electric vehicle. Its internal combustion engine can be driven under high efficiency conditions, and further kinetic energy can be converted into electric power. However, the wheels are driven by only the electromotor, so that a high-power electromotor is required. Additionally, the battery pack is required to have a relatively large capacity. The rated capacity of the battery pack is desirably in the range of 5 to 50 Ah. The capacity is more desirably in the range of 10 to 20 Ah. The rated capacity herein refers to a capacity of a battery pack when the pack is discharged at a rate of 0.2 C.

The second is a hybrid vehicle called a parallel hybrid car. Such a hybrid vehicle has an electromotor which functions also as a power source. An internal combustion engine mainly drives wheels. As the case may be, a part of the dynamic force thereof is converted to an electric power through an electromotor. By use of the electric power, a battery pack is charged. At the time of the start or acceleration of the vehicle, when a load is increased, driving force is assisted by the electromotor. The base of the vehicle is an ordinary vehicle. In a system of the vehicle, a variation in the load on the internal combustion engine is decreased to attain a high efficiency, and the conversion of kinetic energy to electric power is also carried out. The wheels are driven mainly by the internal combustion engine, and thus the output power of the electromotor can be decided optionally depending on the required percentage of assistance. The system, thus, can be constructed with a relatively small electromotor and a battery pack. The rated capacity of the battery pack may be in the range of 1 to 20 Ah, preferably in the range of 5 to 10 Ah.

The third is a hybrid vehicle called a series parallel hybrid car. This is a type combining a series hybrid with a parallel hybrid. The vehicle has a dynamic force dividing mechanism, which divides the output power of an internal combustion engine into a power for generating electric power and a power for driving wheels. This type makes it possible to control a load on an engine more finely than the parallel type, to increase the energy efficiency. The rate capacity of the battery pack is desirably in the range of 1 to 20 Ah, more desirably in the range of 5 to 10 Ah.

The nominal voltage of the battery pack mounted on each of the three hybrid vehicles described above is desirably in the range of 200 to 600 V.

In general, the battery pack is preferably arranged in a space which is not easily affected by a change in the temperature of the outside air and is somewhat protected from impacts. For example, in a sedan type vehicle, the battery pack may be arranged inside a trunk room behind a rear sheet. The battery pack may also be arranged under or behind the sheet. When the mass of the battery is large, it is preferred to arrange the battery under the sheet or below the floor in order to lower the center of gravity of the vehicle.

The fourth embodiment can provide a vehicle having excellent performances by using the battery pack according to the third embodiment, which is excellent in the cycle performance.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXAMPLE

Example 1

Synthesis of Monoclinic β-type Titanium Complex Oxide

Potassium carbonate ($K_2CO_3$), titanium oxide having an anatase structure ($TiO_2$) and niobium oxide ($Nb_2O_5$) were mixed, and the mixture was sintered at 1000° C. for 24 hours to synthesize an alkali titanate compound $K_2(Ti,Nb)_4O_9$. The resultant $K_2(Ti,Nb)_4O_9$ was dry-pulverized with zirconia beads to adjust the particle diameter, and then the particles were washed with distilled water to obtain a proton exchange precursor. The proton exchange precursor was added to a solution of 1 M hydrochloric acid, and then the solution was stirred at 25° C. for 12 hours, and thus a proton exchange body was obtained. The resultant proton exchange body was sintered at 400° C. in the atmosphere for 3 hours to produce a monoclinic a β-type titanium complex oxide ($Ti_{0.94}Nb_{0.06}O_2$) (Sample A).

The resultant substance was identified to be a monoclinic β-type titanium complex oxide by a wide angle X-ray diffraction method under conditions described below. The substance had a BET specific surface area of 17 $m^2/g$ and a 2% pH of 3.4. The 2% pH is a value obtained by adding 1 g of an active material to 50 g of distilled water, stirring the mixture, and measuring a pH of the supernatant liquid.

<Wide Angle X-Ray Diffraction Method>

Figure 6:
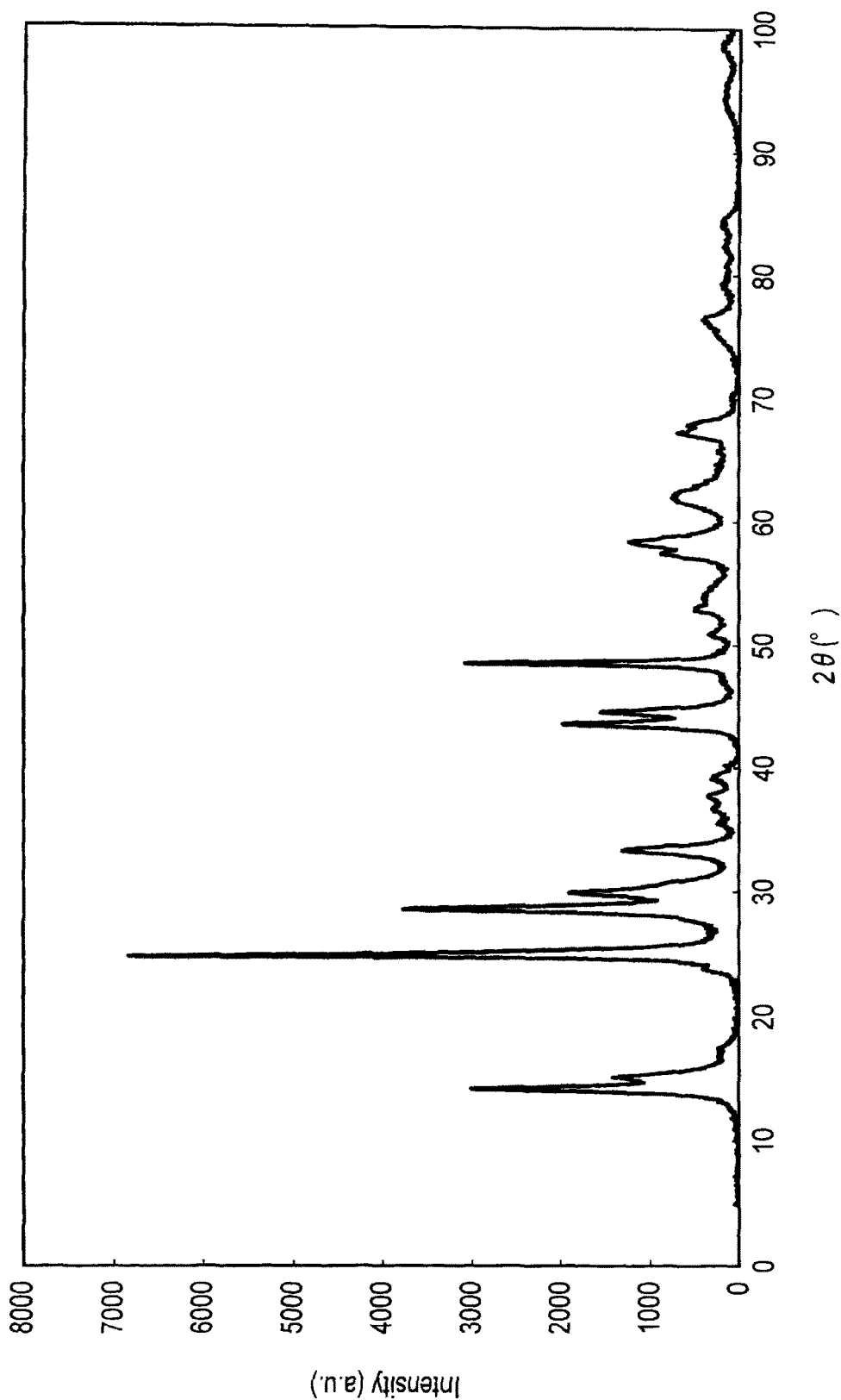
FIG. 6 is an X-ray diffraction pattern of a monoclinic β-type titanium complex oxide in Example 1.

The resultant titanium complex oxide was filled into a standard glass holder having a diameter of 25 mm, and then the oxide was measured by a wide angle X-ray diffraction method. As a result, an X-ray diffraction pattern shown in FIG. 6 was obtained. From the diffraction pattern, it was identified that a main substance constituting the resultant titanium complex oxide was a monoclinic β-type titanium complex oxide belonging to 46-1237 according to JCPDS (Joint Committee on Powder Diffraction Standards). An apparatus and conditions for the measurement were as follows:

(1) X-ray generating apparatus: RU-200R (rotating anticathode-type) manufactured by Rigaku Corporation
   X-ray source: CuKα ray
   Using a curved crystal monochromator (graphite)
   Power: 50 kV, 200 mA
(2) Goniometer: 2155 S2 type manufactured by Rigaku Corporation
   Slit system: 1°-1°-0.15 mm-0.45 mm
   Detector: Scintillation counter
(3) Counting recording device: RINT 1400 type manufactured by Rigaku Corporation
(4) Scanning manner: 2θ/θ continuous scanning
(5) Qualitative analysis
   Measuring range (2θ): 5 to 100°
   Scanning speed: 2°/minute
   Step width (2θ): 0.02°

Then, 100 g of the monoclinic β-type titanium complex oxide was added to 100 g of a solution in which 3 g of lithium hydroxide was dissolved in water, and the solution was put in a dryer having a temperature of 70° C. while the solution was stirred, thereby distilling moisture away from the solution, to obtain a monoclinic β-type titanium complex oxide (Sample B). Sample B had a specific surface area of 17 $m^2/g$ and a 2% pH of 11.4.

Sample B was heated at 400° C. for a further 3 hours in the atmosphere to obtain Sample C. Sample C had a specific surface area of 14 $m^2/g$ and a 2% pH of 11.3.

<Carbon Content>

The carbon content in the resultant titanium complex oxide was measured by an infrared absorbing method. As a result, it was ascertained that the carbon content in Sample C was 0.14% by mass.

<Production of Electrode>

To N-methylpyrrolidone (NMP) were added 80% by mass of the titanium complex oxide powder (Sample C), which was obtained as the active material, 10% by mass of the acetylene black, which was the conductive agent, and 10% by mass of polyvinylidene fluoride (PVdF), which was mixed to prepare a slurry. The slurry was applied on both surfaces of a current collector formed of aluminum foil and having a thickness of 12 μm, and dried and pressed to form an electrode having an electrode density of 2.2 $g/cm^3$. A peel strength test piece, which was obtained by cutting the electrode which had not been pressed yet into a width of 2 cm, had a peel strength of 180 gf/2 cm.

<Preparation of Liquid Nonaqueous Electrolyte>

Ethylene carbonate (EC) and diethyl carbonate (DEC) were mixed at a volume ratio of 1:2 to prepare a mixed solvent. In the mixed solvent was dissolved 1 M of the electrolyte, $LiPF_6$ to prepare a liquid nonaqueous electrolyte.

<Production of Beaker Cell>

A beaker cell was produced using the electrode produced as a working electrode, and lithium metal as a counter electrode and a reference electrode, and the liquid nonaqueous electrolyte described above was injected to the beaker cell, thereby completing a beaker cell (Example 1).

Examples 2 to 5

Four kinds of monoclinic β-type titanium complex oxides having carbonate ions disposed on the surface thereof (Samples D to G) were synthesized in the same production method as described in Example 1 except that an amount of lithium hydroxide in the aqueous lithium hydroxide solution was changed. Specifically, the amount of lithium hydroxide to be added to 100 g of water was 0.3 g in Sample D, 5 g in Sample E, 10 g in Sample F, and 15 g in Sample G. The specific surface area and the 2% pH of each monoclinic β-type titanium complex oxide were described in Table 1.

Using one of Samples D to G as the active material, a beaker cell was produced in the same manner as in Example 1 (Examples 2 to 5).

Example 6

A monoclinic β-type titanium complex oxide having carbonate ions disposed on the surface thereof (Sample H)

was synthesized in the same production method as described in Example 1 except that 3 g of lithium hydroxide in the aqueous solution was changed to 4.6 g of lithium carbonate. The monoclinic β-type titanium complex oxide synthesized had a specific surface area of 15 m²/g and a 2% pH of 11.2.

Using Sample H as the active material, a beaker cell was produced in the same manner as in Example 1 (Example 6).

Comparative Example 1

Using Sample A as the active material, a beaker cell was produced in the same manner as in Example 1 (Comparative Example 1).

Comparative Example 2

Using Sample B as the active material, a beaker cell was produced in the same manner as in Example 1 (Comparative Example 2).

Example 7

Synthesis of Monoclinic β-type Titanium Complex Oxide

Potassium carbonate ($K_2CO_3$) and titanium oxide having an anatase structure ($TiO_2$) were mixed, and the mixture was sintered at 1000° C. for 24 hours to synthesize an alkali titanate compound $K_2Ti_4O_9$. The resultant $K_2Ti_4O_9$ was dry-pulverized with zirconia beads to adjust the particle diameter, and then the particles were washed with distilled water, and thus a proton exchange precursor was obtained. The proton exchange precursor was added to a solution of 1 M hydrochloric acid, and then the solution was stirred at 25° C. for 12 hours, and thus a proton exchange body was obtained. The resultant proton exchange body was sintered at 400° C. in the atmosphere for 3 hours to produce a monoclinic β-type titanium oxide ($TiO_2$) (Sample A'). The resultant substance was identified to be a monoclinic β-type titanium oxide by the wide angle X-ray diffraction method under conditions described above. The substance had a 2% pH of 3.3.

Then, 100 g of the monoclinic β-type titanium oxide was added to 100 g of a solution in which 3 g of lithium hydroxide was dissolved in water, and the solution was put in a dryer having a temperature of 70° C. while the solution was stirred, thereby distilling moisture away from the solution, to obtain a monoclinic β-type titanium oxide of the present invention (Sample B'). Sample B' had a 2% pH of 11.4.

Sample B' was heated at 400° C. for a further 3 hours in the atmosphere to obtain Sample C'. Sample C' had a 2% pH of 11.3.

<Carbon Content>

The carbon content in the resultant titanium oxide was measured by the infrared absorbing method. As a result, it was ascertained that the carbon content in Sample C' was 0.20% by mass.

<Production of Beaker Cell>

Using Sample C' as the active material, a beaker cell was produced in the same manner as in Example 1 (Example 7).

Comparative Example 3

Using Sample A' as the active material, a beaker cell was produced in the same manner as in Example 1 (Comparative Example 3).

Comparative Example 4

Using Sample B' as the active material, a beaker cell was produced in the same manner as in Example 1 (Comparative Example 4).

Comparative Examples 5 to 7

Synthesis of Titanium Complex Oxide Having Spinel Structure

Lithium carbonate ($Li_2CO_3$) and titanium oxide ($TiO_2$) having an anatase structure were mixed, and the mixture was sintered at 850° C. for 24 hours to synthesize a titanium complex oxide having a spinel structure ($Li_4Ti_5O_{12}$) (Sample A"). The resultant substance was identified to be a titanium complex oxide having a spinel structure by the wide angle X-ray diffraction method under the same conditions as above. The substance had a 2% pH of 11.0.

Then, 100 g of the titanium complex oxide having a spinel structure was added to 100 g of a solution in which 3 g of lithium hydroxide was dissolved in water, and the solution was put in a dryer having a temperature of 70° C. while the solution was stirred, thereby distilling moisture away from the solution, to obtain a titanium complex oxide having a spinel structure (Sample B"). Sample B" had a 2% pH of 11.1.

Sample B" was heated at 400° C. for a further 3 hours in the atmosphere to obtain Sample C". Sample C" had a 2% pH of 11.0.

<Carbon Content>

The carbon content in the resultant titanium oxide was measured by the infrared absorbing method. As a result, it was ascertained that the carbon content in Sample C" was 0.62% by mass.

<Production of Beaker Cell>

Using Sample C" as the active material, a beaker cell was produced in the same manner as in Example 1 (Comparative Example 5).

Comparative Example 6

Using Sample A" as the active material, a beaker cell was produced in the same manner as in Example 0.1 (Comparative Example 6).

Comparative Example 7

Using Sample B" as the active material, a beaker cell was produced in the same manner as in Example 1 (Comparative Example 7).

(Measurement Results)

The BET specific surface area (m²/g) and the 2% pH of Samples A to H, Samples A' to C', and Samples A" to C", synthesized as above, are summarized in Table 1 below.

TABLE 1

| | Negative electrode active material | BET specific surface area (m²/g) | 2% pH |
|---|---|---|---|
| Comparative Example 1 | Sample A | 17 | 3.4 |
| Comparative Example 2 | Sample B | 17 | 11.4 |
| Example 1 | Sample C | 14 | 11.3 |
| Example 2 | Sample D | 15 | 11.3 |

TABLE 1-continued

| | Negative electrode active material | BET specific surface area (m²/g) | 2% pH |
|---|---|---|---|
| Example 3 | Sample E | 14 | 11.3 |
| Example 4 | Sample F | 13 | 11.4 |
| Example 5 | Sample G | 12 | 11.4 |
| Example 6 | Sample H | 15 | 11.2 |
| Comparative Example 3 | Sample A' | 20 | 3.3 |
| Comparative Example 4 | Sample B' | 20 | 11.4 |
| Example 7 | Sample C' | 16 | 11.3 |
| Comparative Example 5 | Sample A" | 20 | 11.0 |
| Comparative Example 6 | Sample B" | 20 | 11.1 |
| Comparative Example 7 | Sample C" | 20 | 11.0 |

Samples A to H, Samples A' to C', and Samples A" to C", were subjected to a carbon amount measurement by a high frequency heating-infrared absorbing method and an infrared diffusion reflection measurement using a Fourier transform infrared spectrophotometer (FT-IR). Carbon concentrations and the presence or absence of peaks belonging to carbonate ion ($CO_3^-$) at about 1430 $cm^{-1}$, 1500 $cm^{-1}$, and 2350 $cm^{-1}$ in FT-IR spectra are described in Table 2 below.

The battery performances of the beaker cells produced in Examples 1 to 7 and Comparative Examples 1 to 7 were measured. Specifically, a constant current-constant voltage discharge (lithium intercalation) was performed at 0.2 C and 1 V in a 25° C. environment for 10 hours, and then a constant-current charge (lithium elimination) was performed at 0.2 C until the potential reached 3 V. A lithium elimination amount to a lithium intercalation amount is described in Table 2 as an initial charge/discharge efficiency (%).

TABLE 2

| | Negative electrode active material | Peak at 1430, 1500, and 2350 $cm^{-1}$ | Carbon content (% by mass) | Peel strength (gf/2 cm) | Initial charge/ discharge efficiency (%) |
|---|---|---|---|---|---|
| Comparative Example 1 | Sample A | Absence (ND) | ND | Less than 10 | 82 |
| Comparative Example 2 | Sample B | Absence (ND) | ND | Less than 10 | 84 |
| Example 1 | Sample C | Presence | 0.14 | 120 | 90 |
| Example 2 | Sample D | Presence | 0.02 | 60 | 92 |
| Example 3 | Sample E | Presence | 0.23 | 180 | 92 |
| Example 4 | Sample F | Presence | 0.51 | 220 | 90 |
| Example 5 | Sample G | Presence | 1.02 | 240 | 89 |
| Example 6 | Sample H | Presence | 0.14 | 100 | 90 |
| Comparative Example 3 | Sample A' | Absence (ND) | ND | Less than 10 | 80 |
| Comparative Example 4 | Sample B' | Absence (ND) | ND | Less than 10 | 82 |
| Example 7 | Sample C' | Presence | 0.14 | 100 | 88 |
| Comparative Example 5 | Sample A" | Presence | 0.41 | 20 | 97 |
| Comparative Example 6 | Sample B" | Presence | 0.54 | 20 | 97 |
| Comparative Example 7 | Sample C" | Presence | 0.62 | 20 | 97 |

Figure 7:
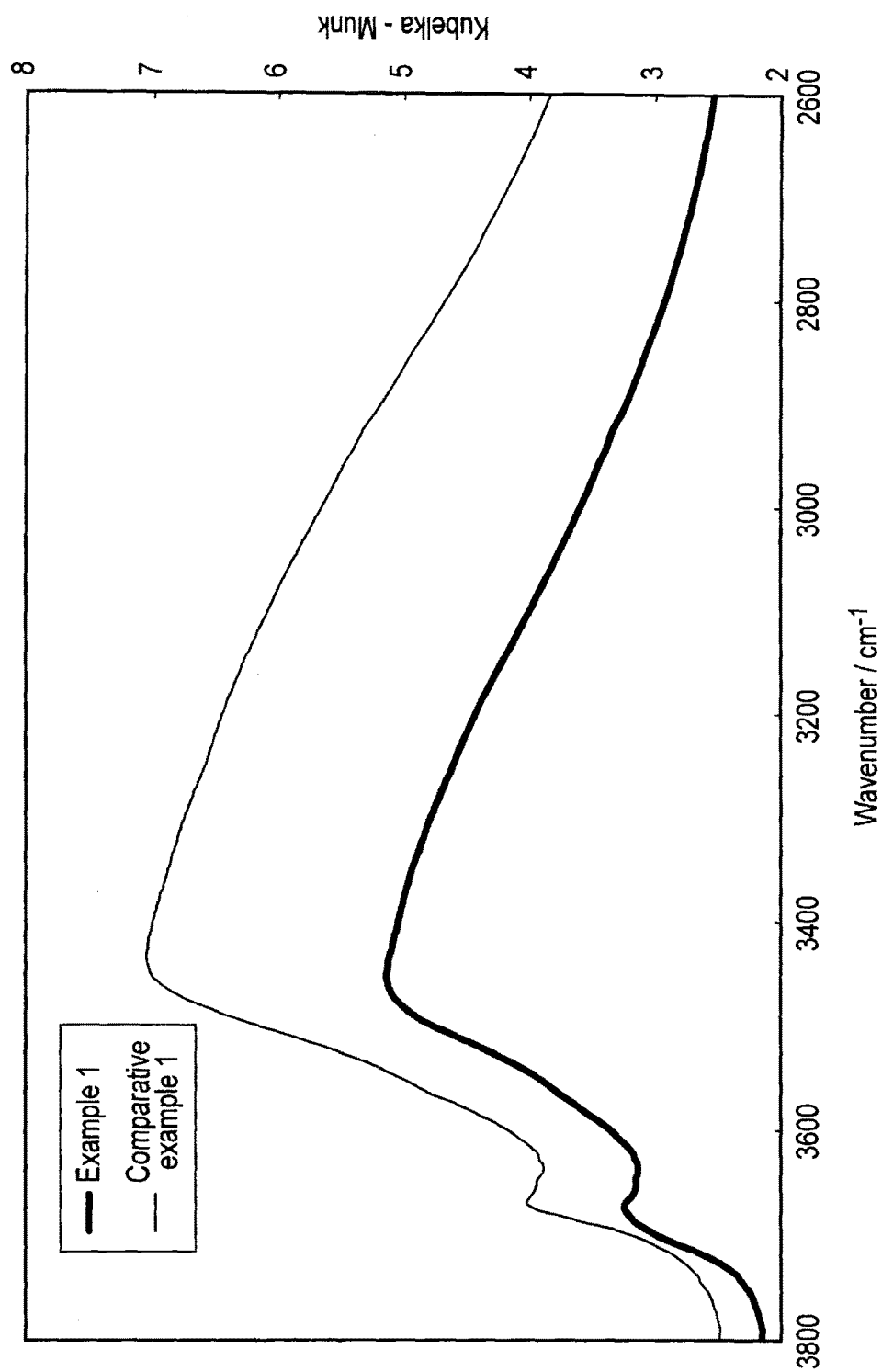
FIG. 7 shows infrared diffuse reflection spectra (2600 to 3800 $cm^{-1}$) of monoclinic β-type titanium complex oxides in Example 1 and Comparative Example 1.
Figure 8:
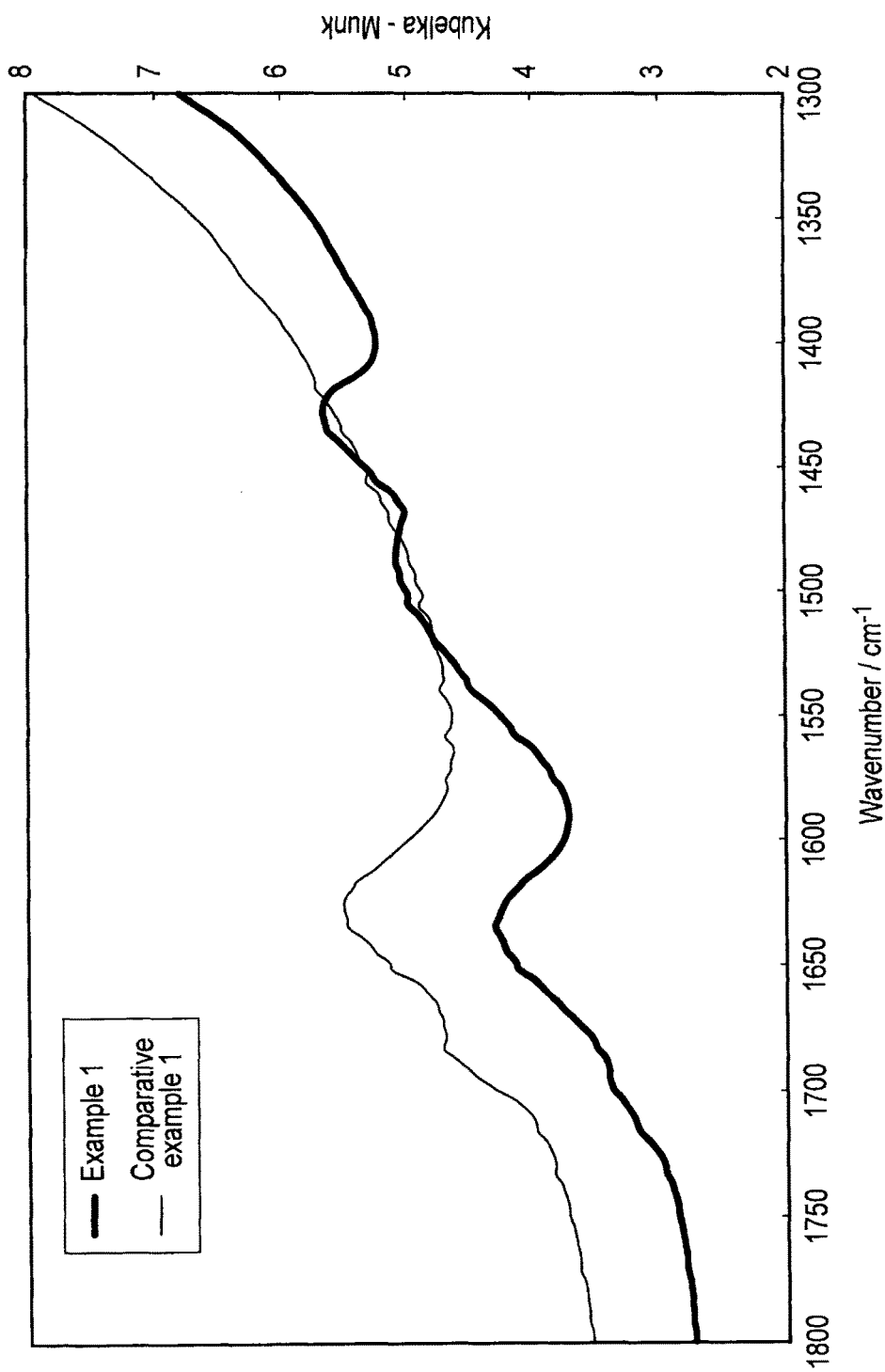
FIG. 8 shows infrared diffuse reflection spectra (1300 to 1800 $cm^{-1}$) of monoclinic β-type titanium complex oxides in Example 1 and Comparative Example 1.
Figure 9:
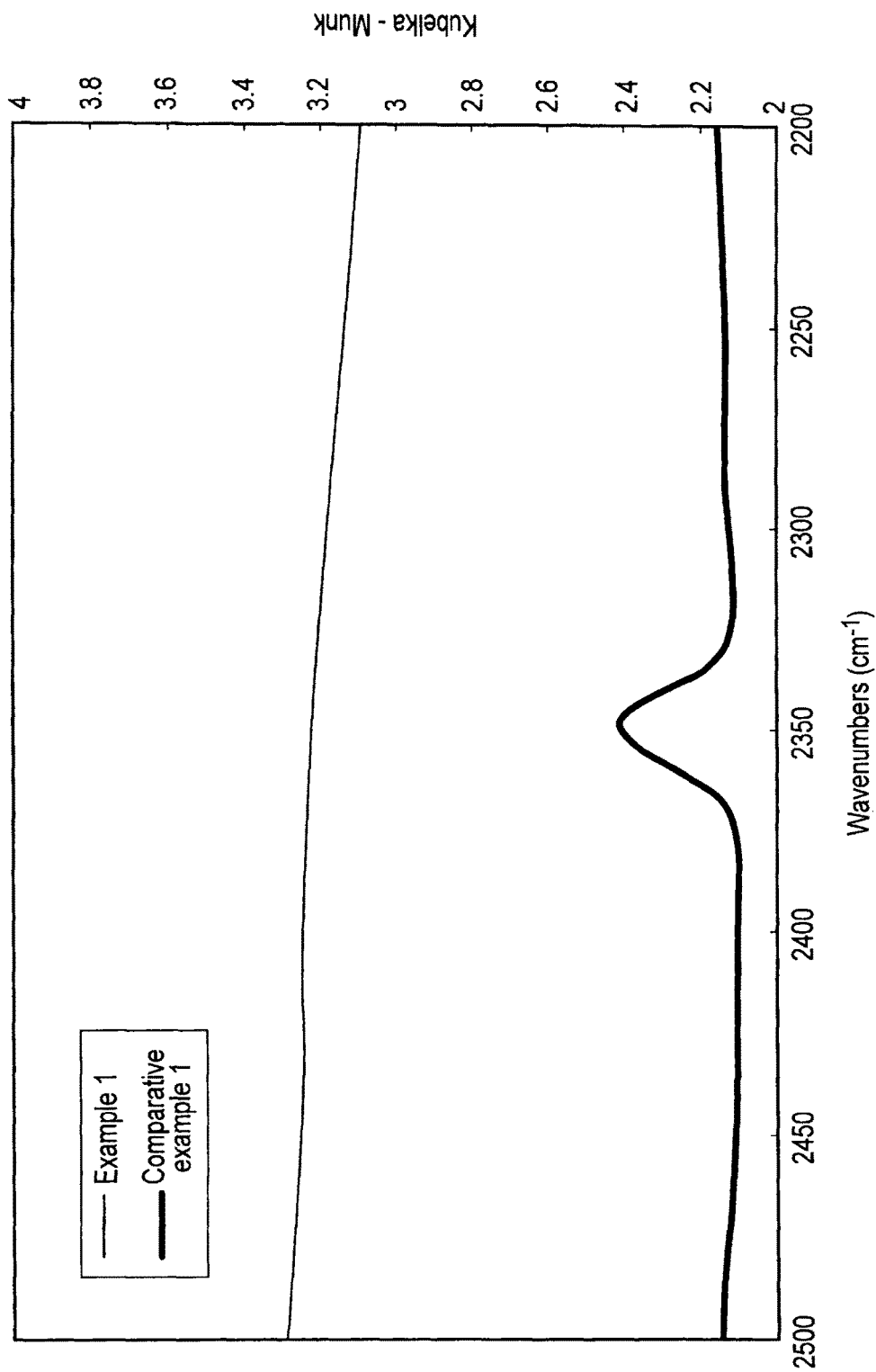
FIG. 9 shows infrared diffuse reflection spectra (2000 to 2500 $cm^{-1}$) of monoclinic β-type titanium complex oxides in Example 1 and Comparative Example 1.

The results obtained in the infrared diffusion reflection measurement, which was performed for the active materials used in Example 1 and Comparative Example 1 (Sample C and Sample A respectively) in a 30° C. environment, are shown in FIG. 7, FIG. 8 and FIG. 9. In FIG. 7, spectra at 2600 to 3800 $cm^{-1}$ are shown, in FIG. 8, spectra at 1300 to 1800 $cm^{-1}$ are shown, and in FIG. 9, spectra at 2000 to 2500 $cm^{-1}$ are shown.

According to FIG. 7, peaks appear at about 3660 $cm^{-1}$ and at about 3450 $cm^{-1}$ in each of Example 1 and Comparative Example 1. The absorption peak at about 3660 $cm^{-1}$ seems to derive from an OH stretching vibration in Ti—OH, which is comparatively isolated, and the absorption peak at about 3450 $cm^{-1}$ seems to derive from an OH stretching vibration in Ti—OH which forms a hydrogen bond with Ti—OH or adsorption water. According to FIG. 8, a peak at about 1635 to 1620 $cm^{-1}$ appears in each of Example 1 and Comparative Example 1. This peak seems to derive from an OH bending vibration in adsorption water. From these measurement results, it is understood that the number of hydroxyl groups on the surface in Example 1 is much smaller than in Comparative Example 1.

From FIG. 8, absorption peaks appear at about 1500 $cm^{-1}$ and 1430 $cm^{-1}$ in Example 1, and the peaks seemed to derive from carbonate ions (mainly from lithium carbonate). On the other hand, such peaks were not observed in Comparative Example 1.

According to FIG. 9, an absorption peak appears at about 2350 $cm^{-1}$ in Example 1, and the peak seemed to derive from carbonate ions (mainly from lithium carbonate). On the other hand, such a peak was not observed in Comparative Example 1.

Next, the active materials used in Example 1, Comparative Example 1 and Comparative Example 2 (Samples C, A and B, respectively) were subjected to the infrared diffusion reflection measurement after pyridine adsorption. Existential states of a Broensted (B) acid site and a Lewis (L) acid site on the sample surface can be examined by this measurement. The measurement procedures are shown below. In addition, the measurement results are shown in FIG. 10.

<Measuring Device for Diffuse Reflection Method>
Fourier transform-type FTIR apparatus: Varian 7000 (manufactured by Varian, Inc.)
Light source: Special ceramic material
Detector: DTGS
Wavenumber resolving power: 4 $cm^{-1}$
The number of multiplication times: 128 or more
Attached device: Diffuse reflection measuring device (manufactured by PIKE Technologies Inc.)
Reference: Gold deposited film
<Measurement Procedures>
(1) A sample powder was set as it was, the temperature thereof was elevated to 150° C. while $N_2$ was passed at 50 ml/minute, and the sample was kept at 150° C. for 30 minutes.
(2) The sample was returned to room temperature, and it was heated again to 100° C.
(3) The pressure of the cell was reduced by an oil diffusion pump, into which pyridine vapor was introduced, and the adsorption thereof was performed for 15 minutes or more.
(4) The sample was kept at 100° C. for 30 minutes or more while $N_2$ was passed at 100 ml/minute. The sample was further heated to 150° C., and it was kept at this temperature for 30 minutes or more. The pyridine, which was physically adsorbed or hydrogen bonded (HPY), was eliminated, and an infrared spectrum measurement was performed in situ.

Figure 10:
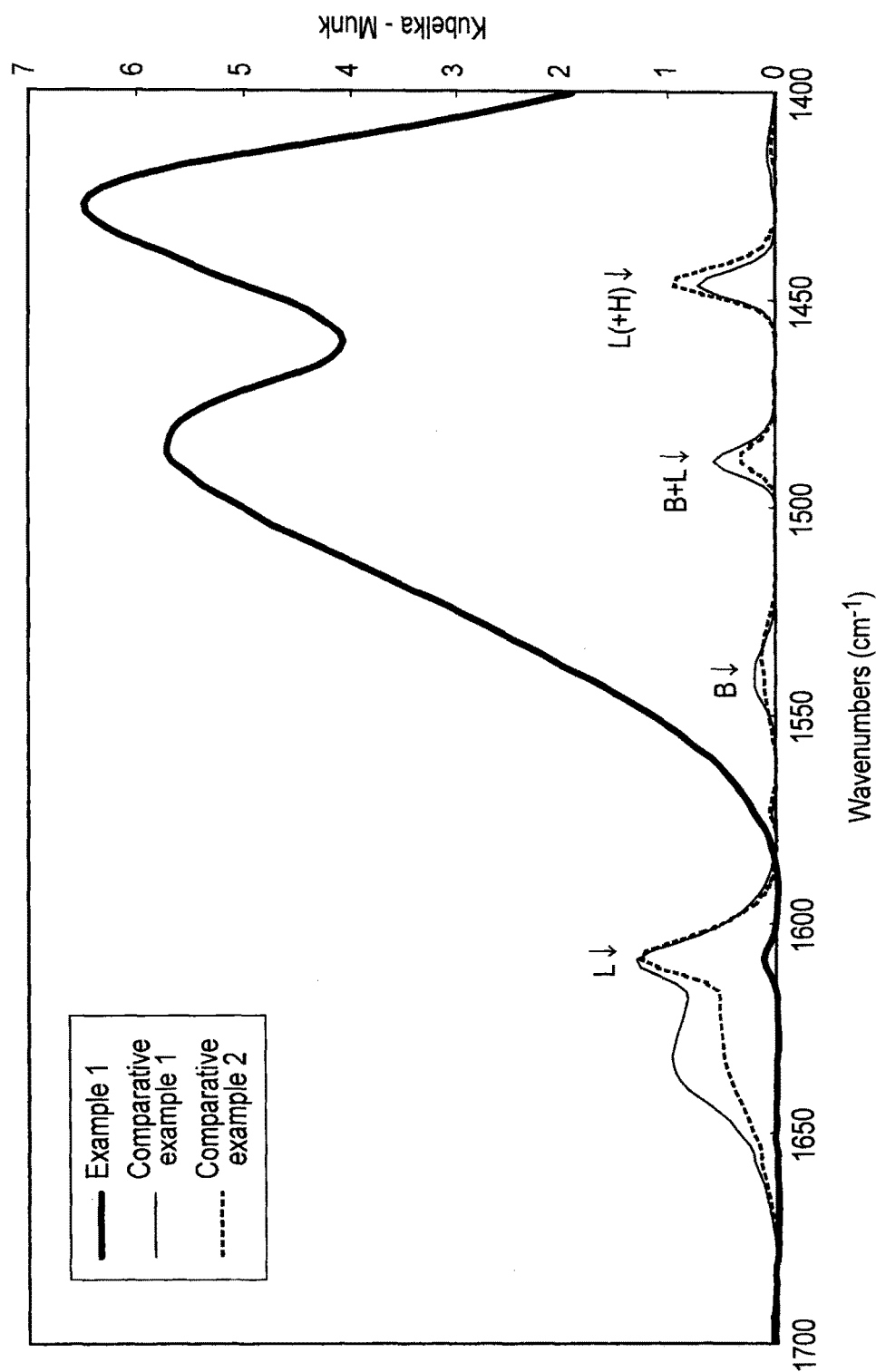
FIG. 10 shows infrared diffuse reflection spectra of monoclinic β-type titanium complex oxides after adsorption of pyridine in Example 1, Comparative Example 1 and Comparative Example 2.

Relevant peaks were classified into three kinds: pyridine bonded to Broensted (B) acid site (BPY, B in FIG. 10), pyridine bonded to Lewis (L) acid site (LPY, L in FIG. 10), and pyridine hydrogen-bonded (HPY, H in FIG. 10), which are shown in FIG. 10. In addition, absorption peak areas at about 1447 cm$^{-1}$, 1540 cm$^{-1}$ and 1608 cm$^{-1}$ derived from pyridine adsorbed to each acid site in each sample (which were S1447, S1540 and S1608, respectively) were calculated, and the values are shown in Table 3. S1447 and S1540 are each obtained by drawing a base line to the absorption peak derived from pyridine and finding an area surrounded by the base line and the curve. S1608 was calculated by peak splitting according to a Gaussian function.

TABLE 3

Absorption peak area of pyridine adsorbed to acid site in each sample

|  | S1447 | S1540 | S1608 |
|---|---|---|---|
| Example 1 | 0.28 | ND | 1.07 |
| Comparative Example 1 | 6.10 | 2.98 | 10.69 |
| Comparative Example 2 | 6.10 | 3.32 | 12.80 |

The active material used in Example 6 (Sample H) was subjected to the same measurement as above, and absorption peak areas of pyridine adsorbed to acid sites were calculated. The results are shown in Table 4.

TABLE 4

Absorption peak area of pyridine adsorbed to acid site in Sample H

|  | S1447 | S1540 | S1608 |
|---|---|---|---|
| Example 6 | 4.28 | 1.28 | 5.37 |

The B acid site concentration of the active material used in Example 1 (Sample C) was at the detection limit or less, and absorption peaks derived from lithium carbonate ($Li_2CO_3$) were observed at about 1480 cm$^{-1}$ and 1425 cm$^{-1}$.

After the test, the battery from Example 1 or Comparative Example 1 was disassembled in a discharge state to take out the negative electrode. The electrode was thoroughly washed with methyl ethyl carbonate, and then an IR measurement was performed on the electrode surface. The measurement results are shown in FIG. 11.

Figure 11:
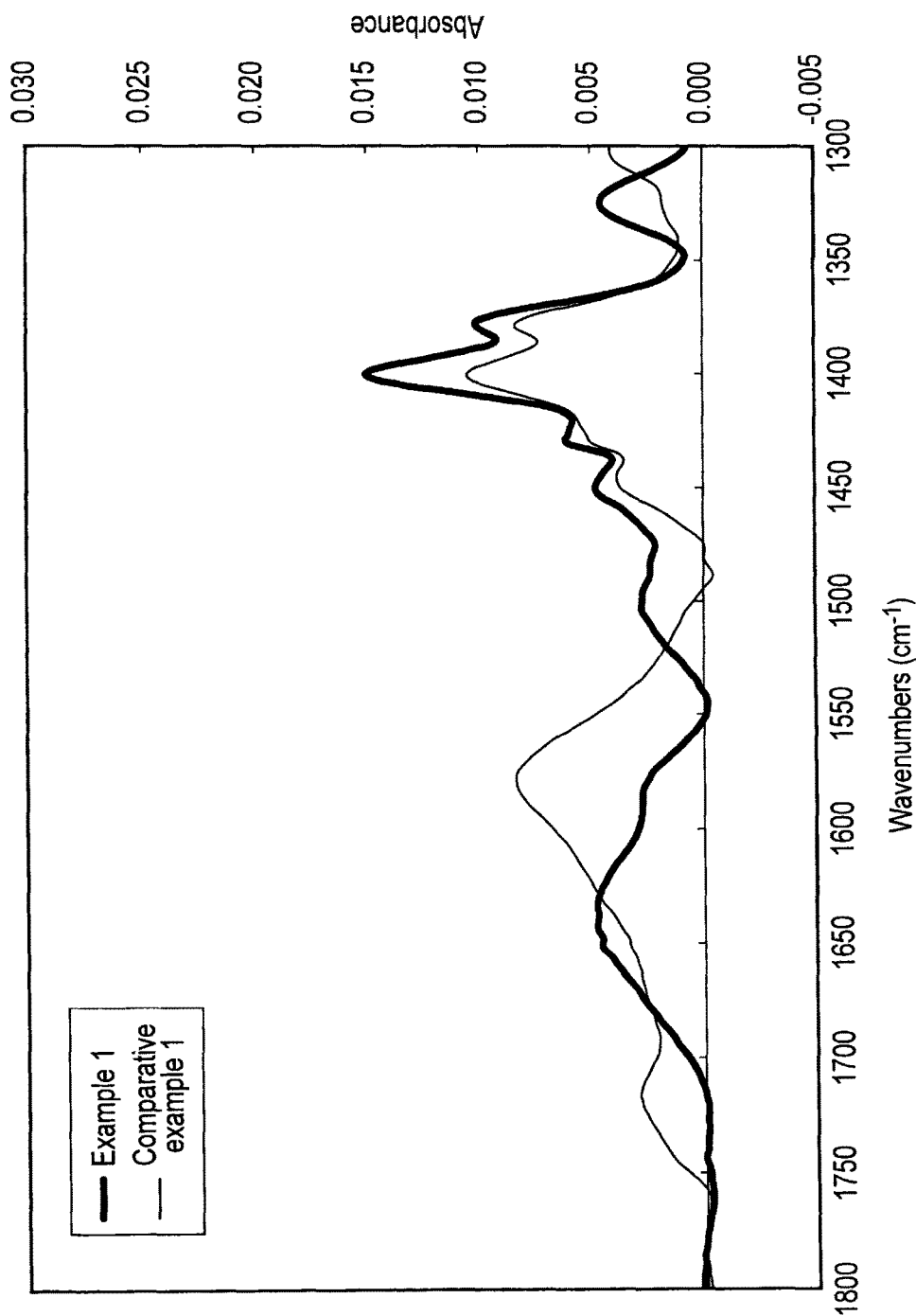
FIG. 11 shows an infrared absorption spectrum of the surface of a negative electrode, which is removed from each battery of Example 1 and Comparative Example 1 after lithium is released.

From FIG. 11, it is seen that in the IR spectrum of the negative electrode taken out from the battery of Example 1 in which Sample C was used as the active material, a peak of carbonate ions clearly appears at 1500 cm$^{-1}$; whereas, in the IR spectrum of the negative electrode taken out from the battery of Comparative Example 1, such a peak cannot be observed.

Further, the negative electrode taken out was subjected to ultrasonic cleaning, and only the negative electrode active material was taken out by centrifugation. The negative electrode active material taken out was heat-treated at 300° C., and then the carbon content in the active material was measured by an infrared absorbing method. As a result, the active material taken out from the battery of Example 1 had a carbon content of 0.13% by mass, and the active material taken out from the battery of Comparative Example 1 had a carbon content of a measurement limit or less.

Table 2 shows that in the study of the monoclinic β-type titanium oxide or the monoclinic β-type titanium complex oxide, the batteries of Examples 1 to 7 had a higher peel strength in the electrode and a higher initial charge/discharge efficiency than the batteries of Comparative Examples 1 to 4. As the batteries of Examples 1 to 6 have the higher peel strength in the electrode and the higher initial charge/discharge efficiency than those of Comparative Examples 1 and 2, it was shown that side reactions could be inhibited by disposing the lithium carbonate on the surface of the monoclinic β-type titanium complex oxide.

On the other hand, in the study of the titanium complex oxide having a spinel structure, the effects obtained in Examples 1 to 7 could not be observed from the results shown in Comparative Examples 5 to 7.

What is claimed is:

1. An active material, comprising a monoclinic β-type titanium oxide or a monoclinic β-type titanium complex oxide, wherein a carbonate ion is disposed on at least a part of a surface of the active material, and wherein the active material has a peak belonging to a carbonate ion in at least a region of 1430±30 cm$^{-1}$, 1500±30 cm$^{-1}$ and 2350±30 cm$^{-1}$ in an infrared diffuse reflection spectrum obtained using a Fourier transform infrared spectrophotometer.

2. The active material according to claim 1, wherein said carbonate ion is provided by lithium carbonate disposed on said at least said part of said surface of the active material.

3. The active material according to claim 1, wherein the active material has a carbon content of 0.02 to 3% by mass based on a total amount of active material.

4. The active material according to claim 1, wherein the active material is in a state of a fibrous particle or an aggregate of fibrous particles.

5. The active material according to claim 1, wherein the active material is an active material for a battery.

6. The active material according to claim 1, wherein the active material comprises said monoclinic β-type titanium oxide.

7. The active material according to claim 1, wherein the active material comprises said monoclinic β-type titanium complex oxide.

8. The active material according to claim 1, wherein the active material has a carbon content of 0.51% by mass or more based on a total amount of active material.

9. The active material according to claim 1, wherein the carbonate ion covers the entire surface of the active material.

10. The active material according to claim 2, wherein the active material comprises said monoclinic β-type titanium oxide.

11. The active material according to claim 2, wherein the active material comprises said monoclinic β-type titanium complex oxide.

12. The active material according to claim 1, wherein the active material has a carbon content of 0.51 to 3% by mass based on a total amount of active material.

13. The active material according to claim 2, wherein the lithium carbonate covers the entire surface of the active material.

14. The active material according to claim 1, further comprising a lithium hydroxide disposed on at least a part of a surface of the active material.

15. A nonaqueous electrolyte battery, comprising:
a positive electrode;
a negative electrode comprising the active material according to claim 1; and
a nonaqueous electrolyte.

16. The nonaqueous electrolyte battery according to claim 15, wherein the negative electrode further comprises polyvinylidene fluoride.

17. The nonaqueous electrolyte battery according to claim 15, further comprising a case formed of a laminate film.

18. A battery pack, comprising one or more of the nonaqueous electrolyte batteries according to claim 15.

19. The battery pack according to claim 18, comprising a plurality of the nonaqueous electrolyte batteries, and wherein the plurality of nonaqueous electrolyte batteries are connected electrically to each other, and the battery pack further comprises a protective circuit that can detect the voltage of each of the nonaqueous electrolyte batteries.

\* \* \* \* \*